(No Model.)
E. ACKERMANN.
SPICE BOX.
No. 597,077. Patented Jan. 11, 1898.
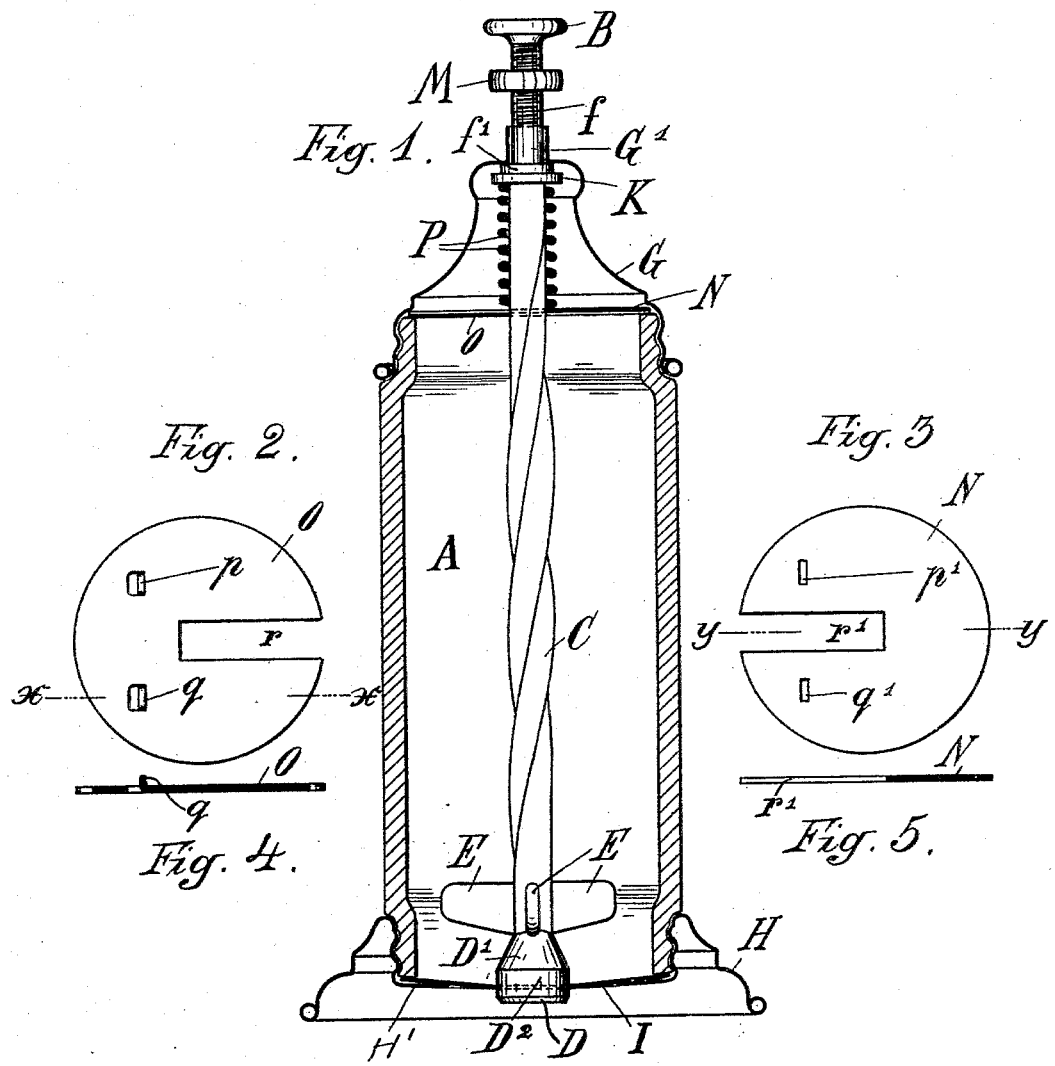
WITNESS:
H Richard Wolse
Otto Munk
INVENTOR
Eduard Ackermann,
by
Atty s

UNITED STATES PATENT OFFICE.

EDUARD ACKERMANN, OF COLOGNE, GERMANY.

SPICE-BOX.

SPECIFICATION forming part of Letters Patent No. 597,077, dated January 11, 1898.

Application filed February 17, 1897. Serial No. 623,864. (No model.) Patented in France October 17, 1894, No. 242,160, and in England March 20, 1895, No. 5,841.

*To all whom it may concern:*

Be it known that I, EDUARD ACKERMANN, merchant, a subject of the German Emperor, residing at Cologne, in the Empire of Germany, have invented certain new and useful Improvements in Spice-Boxes with Spreading Contrivances, of which the following is a full and clear specification.

The invention has been patented in England, No. 5,841, dated March 20, 1895, and in France, No. 242,160, dated October 17, 1894.

My invention relates to a spice-box with spreading contrivance, by means of which the ground spices are preserved against moisture and dust, so that the spices are at every moment ready for use, this box being adapted as well for kitchen as for table purposes. By means of a simple spreading contrivance it is further possible to regulate exactly the quantity of spice spread out.

Referring to the accompanying drawings, forming a part of this specification, and in which similar letters of reference indicate similar parts throughout the several views, Figure 1 is a vertical section through a spice-box with spreading contrivance embodying my invention. Figs. 2 and 3 are details of the apparatus; Figs. 4 and 5, sections through the objects shown in Figs. 2 and 3.

The box proper or casing A for the spices is of cylindrical or prismatical shape and is made of a material which is not liable to be attacked by the spices, said box or casing being open at the bottom and at the upper part, the bottom and upper part being slightly smaller than the middle part of the casing and being screw-threaded.

A disk or plate I closes the casing A at its bottom part, and this disk is pressed against A by means of the projecting flange H' of piece H, which is screwed on the bottom part of casing A. The piece H is shaped so as to form a foot on which the whole apparatus is to rest. At the top the box or casing A is closed by means of two disks or plates O N, lying one over the other, said disks being suitably prevented from displacement relatively to one another. These disks or plates O N are pressed against the top of the casing A by means of a cover G, to be screwed on said top, said cover G serving at the same time the purpose of receiving and guiding the movable parts of the apparatus. For the purpose of pressing the disks O and N against the casing A the cover G, as shown in Fig. 1, projects over said disks O and N and is screwed on the top of the casing A.

The spindle C, which is made of glass or other material which cannot be attacked by the spices, is provided above with a ring-shaped projection K, while said spindle C is provided beneath with a conical valve-plug D and several projections or wings E (in the drawings, Fig. 1, four such wings have been represented) for the purpose of stirring the spices contained in the casing A. The spindle C is disposed in the middle of casing A in such a way that its axis coincides with the axis of the apparatus and is guided in the central openings of the disks or plates N, O, and I.

Between the disk N and the collar K is arranged a spiral spring P, which presses the collar K of spindle C against a projection $f'$ of the rod $f$, the latter being guided in the neck G' of cover G. The rod $f$ at the part which projects over the neck G' is provided with a screw-thread, upon which is screwed a nut M, while for the purpose of facilitating the manipulation said rod $f$ is provided on its top with a button B. Owing to the hereinbefore-described disposition, the spindle C can be shifted axially downward by means of the button B, and owing to the elasticity of the spring P the spindle C can still return, together with the button B, to its original position. Now the spindle C not only moves axially, but at the same time revolves about its axis, so that the resulting motion is a spiral-like one. To this purpose the spindle C is not cylindrical, but of prismatical form, the section of same being preferably a quadratic one, and said spindle C is made up of spiral ribs forming a screw of large pitch. Of course care must be taken that the different sections of the spindle do not get deformed relatively to each other. The disks or plates O and N are both provided with slits or notches $r$ and $r'$, Figs. 2 and 3, the latter extending radially from the circumference to a point situated a little over—that is, as far as half the width of the slit $r$ or $r'$ over the center of O and N. By putting the disks or plates O and N on top of one another the axis of the disk O and the axis of the disk N are made to coincide exactly one with another, but the open sides lie opposite to each other, so that an opening is formed in the middle, this opening having exactly the diameter of the rod C. In order that the plates O and N cannot change their position accidentally, their relative position is secured by means of two tongues $p$ and $q$, said tongues being preferably made in one piece with the plate O and engaging into the slits $p'$ $q'$ in the disk or plate N.

Figs. 4 and 5 are sections on lines $x$ $x$ and $y$ $y$ of Figs. 2 and 3, respectively, and are intended for showing the disposition of the connecting-tongues $p$ and $q$ of the disk O and the slits $p'$ and $q'$ of the disk N.

The valve D at the bottom part of spindle C, below the projections or wings E of the latter, comprises a conical part $D'$ and a cylindrical part $D^2$, the latter closing completely the opening of I as soon as the apparatus is not in use.

If one desires to use the apparatus, one has to press on the button B, whereby the spindle C is pressed downward and revolves at the same time about its axis, owing to the thread which the spindle C possesses, the latter being guided in the slits $r$ and $r'$ of the disks O and N, respectively, which slits form a kind of nut in which the spindle C can revolve freely. Further, the projections or wings E of spindle C are stirring the spice or salt contained in the casing A and pressing the same through the opening of plate I, which is gradually opened owing to the gradual diminution of diameter of the conical part of the valve D. The quantity of material thrown out of the apparatus can be easily regulated by means of the nut M, which can be raised or lowered along the rod $f$ as one desires, whereby the path of the spindle C in the axial direction gets limited, the outflow of material being controlled in each case by the annular surface left between the opening of the plate I and the outer surface of the conical part of the valve D.

Having thus fully described my invention, I declare that what I claim, and desire to secure by Letters Patent, is—

1. In combination, the casing having a lower discharge-outlet, a valve closing the same, a rotary longitudinally-movable spindle attached to the valve, means coacting with the spindle for rotating the same and the stirrer-wings on the rod, said valve-spindle being spirally threaded whereby longitudinal movement thereof will cause a rotary movement, substantially as described.

2. In combination, the casing, a bottom plate having an opening therein, a base-screw threaded upon the end of the casing and overlapping the bottom plate to hold the same, a valve arranged in the bottom plate, and the valve-rod for operating said valve, substantially as described.

3. In combination, the casing having a bottom with a conical valve therein, the spirally-threaded valve-rod extending up through and above the casing, the means for rotating the rod as it is moved longitudinally and means to limit the movement of the conical valve.

4. In combination, the casing, the valve at the bottom, the screw-rod connected to the valve, the wings on the rod, the two plates O and N having openings extending reversely and embracing the screw-rod, said plates forming a nut for the said rod, and means for holding the plates to the casing, substantially as described.

5. In combination, the casing having a valve at the bottom, the screw-rod, the two plates O and N having openings and forming a nut for the valve-rod, said plates being connected together by projections on the one fitting in openings in the other, and the wings on the screw-rod with means for returning the screw-rod to normal position.

6. In combination, the casing, the valve, the screw-rod, the plates O and N having openings and forming a nut for the said rod, the wings on the rod and the cover G for holding the plates, said cover being screwed upon the casing, substantially as described.

Signed at Cologne, in the Empire of Germany, this 15th day of January, 1897.

EDUARD ACKERMANN.

Witnesses:
JÜSTUS MAŸRHOFER,
GUSTAV HOEKELMANN.